Figure 1:
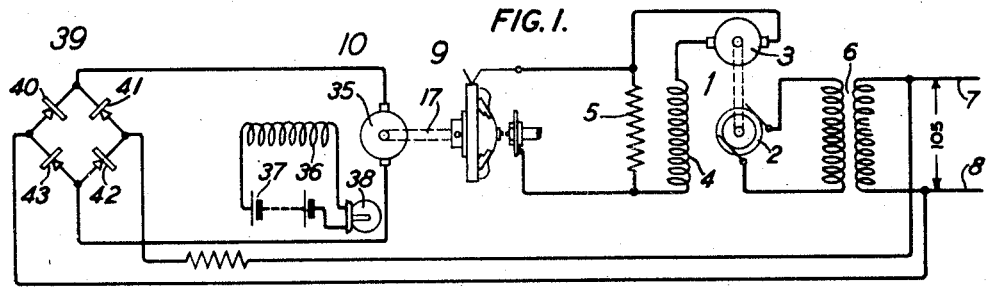

June 27, 1933.  J. H. SOLE  1,915,389

REGULATOR SYSTEM

Filed May 29, 1931

INVENTOR
J. H. SOLE
BY Wayne B Wells
ATTORNEY

Patented June 27, 1933

1,915,389

UNITED STATES PATENT OFFICE

JOHN H. SOLE, OF BROOKLYN, NEW YORK, ASSIGNOR TO BELL TELEPHONE LABORATORIES, INCORPORATED, OF NEW YORK, N. Y., A CORPORATION OF NEW YORK

REGULATOR SYSTEM

Application filed May 29, 1931. Serial No. 540,831.

This invention relates to regulator systems and particularly to regulator systems for controlling the voltage of alternating current generators.

One object of the invention is to provide a regulator system that shall maintain the voltage of an alternating current generator constant and that shall effect overcompensation to insure against hunting action.

Another object of the invention is to provide a regulator system for maintaining the voltage of an alternating current generator constant that shall employ a rectifier having a non-linear resistance-voltage characteristic curve for controlling the generator excitation according to the generated voltage and for effecting overcompensation to insure against hunting action.

Another object of the invention is to provide a regulator system for maintaining the voltage of an alternating current generator constant that shall employ a copper oxide rectifier for controlling the regulating apparatus according to the generated voltage and that shall operate on a portion of the resistance-voltage characteristic curve of the copper oxide rectifier to effect overcompensation and insure against hunting action.

A further object of the invention is to provide a regulator system for maintaining the voltage of an alternating current generator constant that shall govern the generator excitation by a centrifugal governor operated by a motor having constant field excitation and that shall control the motor according to the generator voltage by a rectifier operated on a non-linear portion of its resistance-voltage characteristic curve.

When regulating a small alternating current generator to maintain the generated voltage substantially constant it is necessary to provide regulating apparatus that shall take a very small amount of power from the generator. Furthermore, if the regulating apparatus is very sensitive and quick-acting it is necessary to provide means to insure against hunting action.

In a regulator system constructed according to the invention the field excitation of an alternating current generator is controlled in accordance with the generated voltage in a simple and efficient manner to maintain the generator voltage constant without taking any substantial amount of power away from the generator. Furthermore, means is provided for so effecting overcompensation as to insure against hunting action.

According to the present invention a centrifugal governor is provided for controlling a resistance element in the field circuit of the alternating current generator. The centrifugal governor is operated by a motor having constant field excitation so that the motor is operated at a speed depending upon the voltage of the current supplied to the armature thereof. The motor is operated at a speed depending upon the voltage of the generator. Between the motor and the generator output circuit is interposed a full wave copper oxide rectifier. The copper oxide rectifier not only serves to supply direct current which varies in voltage according to the voltage variations of the generator voltage but also effects overcompensation to insure against the so-called hunting action. The resistance-voltage characteristic curve of a copper oxide rectifier has portions thereof which are non-linear. The rectifier is operated on the non-linear portion of its resistance-voltage characteristic curve so that the voltage variation supplied to the motor is somewhat different from the voltage variation of the generator. This change in the voltage variation serves to overcompensate the regulating operation and to insure against hunting action.

The motor and the centrifugal governor associated therewith are so designed that if a predetermined voltage change is applied to the motor the contacts of the centrifugal governor will be operated by a smaller angular change in speed of the motor and the centrifugal governor than is necessary to compensate for the change in the generator voltage. This operation on the part of the motor and centrifugal governor also acts to insure against hunting action.

The motor and the centrifugal governor employed in this invention may be of the type disclosed in the patent to J. H. Sole, No. 1,860,556, dated May 31, 1932.

Figure 2:
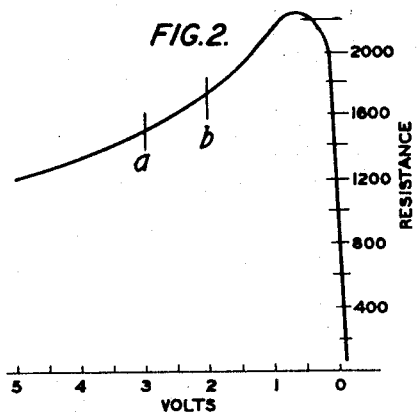
Figure 3:
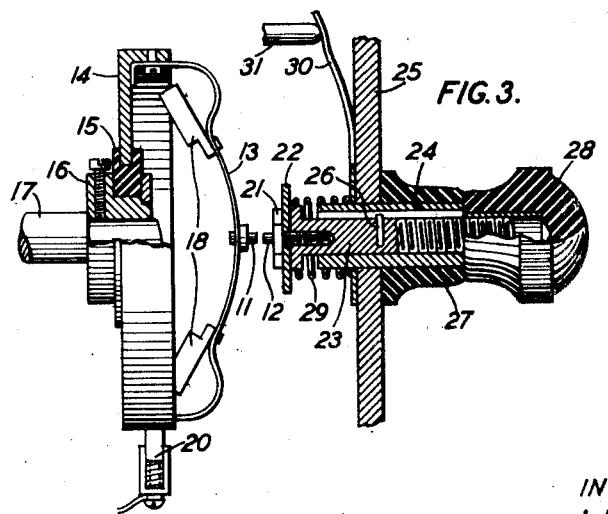

In the accompanying drawing Fig. 1 is a diagrammatic view of a regulator system constructed in accordance with the invention;

Fig. 2 is a diagrammatic view of a resistance-voltage characteristic curve of a copper oxide rectifier; and Fig. 3 is a diagrammatic view of the centrifugal governor.

Referring to Fig. 1 of the drawing, a double current generator 1 which is driven by a motor (not shown) comprises an armature having slip rings 2 and commutator 3 and a field winding 4. The field winding 4 is connected to the commutator 3 in series with a regulating resistance element 5. The slip rings 2 are connected by a transformer 6 to the load conductors 7 and 8. A centrifugal governor 9 of the type disclosed in the above mentioned patent to J. H. Sole, No. 1,860,556 is provided for controlling a shunt circuit around the resistance element 5.

Referring to Fig. 3 of the drawing, the centrifugal governor 9 comprises a vibratory contact member 11 which is mounted on a spring member 13. The spring member 13 is attached at its ends to a brass cup-shaped member 14. The cup-shaped member 14 is mounted on a ring of insulating material 15 which in turn is secured to a collar 16 preferably made of steel. The collar 16 is secured by a set screw to the armature shaft 17 of a motor 10. The spring member 13 carries two weight members 18 located on opposite sides of the contact member 11. The weight members 18 upon rotation of the governor are operated by centrifugal force to exert a force tending to move the contact member 11 away from a stationary contact member 12. The contact member 11 is not only moved in accordance with the angular changes in speed of rotation of the centrifugal governor and the motor 10 but also vibrates constantly in accordance with the inherent vibration rate of spring support 13. The cup-shaped member 14 serves as a slip ring for connecting a brush member 20 with the movable contact member 11.

The stationary contact member 12 is mounted on a bolt member 21 and secures a washer or disc member 22 to a shaft 23 which is preferably made of brass. The shaft 23 is mounted in a brass slip 24 which in turn is carried by an insulating support 25. A pin 26 projects from the shaft 23 into a slot in the brass sleeve in order to prevent rotation of the shaft with respect to the sleeve or the insulating support 25. A collar 27 is fixedly secured to the sleeve 24 and engages one side of the insulating support 25 as shown in Fig. 3 of the drawing. A thumb nut 28 is threadedly connected to the end of the shaft 23 in order to effect longitudinal movement of the shaft upon rotation of the nut. A spring member 29 is positioned between the disc 23 and the insulating support 25 for exerting a force tending to move the stationary contact member 12 into engagement with the vibratory contact member 11. Normally when the centrifugal governor is not in rotation the contact members 11 and 12 are in engagement with each other. The stationary contact member 12 is connected by a spring member 30 to a contact 31.

The motor 10 comprises an armature 35 and a field winding 36. The field winding 36 is energized by a battery 37 in circuit with a ballast lamp 38. The field winding is connected to the battery in series with the ballast lamp in order to effect constant field excitation of the motor. The field winding may also be slightly saturated. When the field excitation of the motor is constant the speed of rotation thereof will vary directly in accordance with the voltage of the current supplied to the armature thereof. It is to be understood that other means for effecting constant field excitation of the motor may be employed, for example, the field winding may be saturated in a manner disclosed in the patent to J. H. Sole, No. 1,860,556.

The armature 35 of the motor is connected to the load conductors 7 and 8 of the generator 1 by means of a full wave copper oxide rectifier 39. The copper oxide rectifier may be of the type disclosed in the L. O. Grondahl Patent 1,640,335, dated August 23, 1927. The rectifier comprises four parts 40, 41, 42 and 43 which are connected in the form of a Wheatstone bridge having one pair of vertices connected to the armature of the motor and the other pair of vertices connected through a resistance element 43 to the load conductors 7 and 8 of the generator.

The disc of a copper oxide rectifier has a resistance-voltage characteristic curve as shown in Fig. 2 of the drawing. In this curve the abscissa is assumed to be volts input to the rectifier and the ordinates are assumed to be in terms of resistance. Preferably during a regulating operation the copper oxide rectifier is operated between the points $a$ and $b$ on the characteristic curve of the rectifier. This portion of the characteristic curve included between the points $a$ and $b$ is non-linear and therefore the rectifier does not follow Ohm's law. By taking advantage of the characteristic curve so that the rectifier operates on the non-linear portion thereof it is obvious that for a certain change in the input voltage of the rectifier a slightly different change will be obtained in the output thereof. By this means overcompensation may be affected and the so-called hunting action prevented.

The load conductors 7 and 8 are assumed to have substantially 110 volts impressed thereon. The vertices of the Wheatstone bridge rectifier arrangement are connected to the conductors 7 and 8 through a resistance element or transformer to have substantially 80 volts impressed thereon. The number of discs employed to build up the rectifier sections 40, 41, 42 and 43 is determined according to the number required to effect operation on the above indicated non-linear portion of the resistance-voltage characteristic curve of a copper oxide rectifier.

Referring to Fig. 2 of the drawing it will be noted that the points $a$ and $b$ represent a 3 volt and 2 volt input to a single rectifier element. The number of elements employed in each rectifier section will be determined in accordance with the voltage input which in this case is substantially 80 volts. With an 80 volt input applied to the copper oxide rectifier approximately 75 volts will be applied to the armature 35 of the motor 10. If there is a variation from the normal 80 volts applied to the input of the rectifier a different variation of the output will be effected. This serves as above set forth to effect overcompensation and to prevent hunting action.

If there is any tendency of the voltage of the generator to change, the angular speed of the motor 10 and the centrifugal governor 9 is varied for controlling the vibratory contact member 11. The contact members 11 and 12 control the resistance element 5 to govern the generator excitation and maintain the generator voltage substantially constant. The motor 10 and the centrifugal governor 9 are mare very sensitive and quick-acting so as to have the tendency to overcompensate the regulating operation. If the generator 1 tends to develop a certain change in voltage it will be necessary for the motor and the governor to effect a certain change in angular speed to control the generator excitation and compensate for the tendency of the generator to change in voltage. However, the motor and governor are made so sensitive as to effect a greater angular change than is necessary to operate the governor contact members and compensate for the generator change in voltage. This overcompensation tends to prevent hunting action.

Modifications in the system and the arrangement nad location of parts may be made voltage variation according to the genera- and such modifications are intended to be covered by the appended claims.

What is claimed is:

1. In a regulator system, an alternating current generator, regulator means for governing the excitation of said generator, and rectifying means comprising a full wave copper oxide rectifier operating on a non-linear portion of its characteristic resistance voltage curve and connected to said generator for supplying said regulator means with rectified current having a greater voltage variation than the voltage variation of the current supplied to the rectifier to control said means so as to maintain the generator voltage constant and to overcompensate the regulator means to prevent hunting action.

2. In a regulator system, an alternating current generator, centrifugal governor means for controlling the excitation of said generator, a full wave copper oxide rectifier connected to said generator for operating on a non-linear portion of its characteristic resistance-voltage curve so that the output from the rectifier has a greater voltage variation than the voltage variation of the curent supplied thereto by the generator, and a motor operated by said rectifier for controlling said centrifugal governor means to maintain the generator voltage constant.

3. In a regulator system, an alternating current generator, a motor having constant field excitation to rotate at a speed dependent on the voltage of the current supplied to the armature thereof, means operated by said motor for governing the generator excitation according to the motor speed, and means connected to the motor for supplying the armature thereof with rectified current having a variation in voltage with but greater than the variations of the generator voltage for controlling the generator excitation to maintain the generator voltage constant and to prevent hunting action.

4. In a regulator system, an alternating current generator, a motor operated at a speed dependent on the voltage of the current supplied to the armature thereof, means operated by said motor for governing the generator excitation according to the motor speed, and means comprising a full wave copper oxide rectifier for supplying the motor armature with direct current from said generator having a greater voltage variation than the generator to maintain the generator voltage constant and to insure against hunting action.

5. In a regulator system, an alternating current generator having a regulating field winding, a motor having constant field excitation to rotate at a speed dependent on the voltage of the current supplied to the armature thereof, means comprising a centrifugal governor operated by said motor for governing the excitation of said field winding according to the motor speed, and means connected to the motor armature for supplying said motor with rectified current having a variation in voltage with but greater than the variations of the generator voltage to so control said field winding as to maintain the generator voltage constant and insure against hunting action.

6. In a regulator system, a self-excited alternating current generator, a motor having constant field excitation to rotate at a speed dependent on the voltage of the current supplied to the armature thereof, a resistance element in the field circuit of said generator, a centrifugal governor operated by said motor and having a vibratory contact member for short-circuiting said resistance at a rate depending on the motor speed, and a copper oxide rectifier connected to said generator for supplying the armature of said motor with rectified current having a voltage variation different from the generator voltage variation to operate the motor and maintain the generator voltage constant while preventing hunting action.

7. In a regulator system, an alternating current generator, means comprising a centrifugal governor having a stationary contact member and a vibratory contact member for controlling the excitation of said generator, a motor having constant field excitation to rotate at a speed dependent on the voltage of the current supplied to the armature thereof for operating said governor, and means comprising a rectifier for operating said motor according to the generator voltage, said motor and the centrifugal regulator being so arranged that for a given voltage change applied to the motor the contacts of the centrifugal governor operate with a smaller angular change in speed than is necessary to compensate the generator for the change in voltage to prevent hunting action.

8. In a regulator system, an alternating current generator having a regulating field winding, a resistance element in the circuit of said field winding, a motor having constant field excitation to rotate at a speed dependent on the voltage of the current supplied to the armature thereof, a centrifugal governor operated by said motor, said governor having a stationary contact member and a vibratory contact member aligned with the axis of rotation of the governor for controlling said resistance element, and means comprising a rectifier for operating said motor according to the generator voltage, said motor and the centrifugal regulator being so arranged that for a given voltage change applied to the motor the contacts of the centrifugal governor operate with a smaller angular change in speed than is necessary to compensate the generator for the change in voltage to prevent hunting action.

9. In a regulator system, an alternating current generator, regulator means for governing the excitation of said generator, rectifying means connected to said regulator means and means for supplying said rectifying means with alternating current having a voltage variation according to the generator voltage variation, said rectifier means comprising a copper-oxide rectifier operating on a non-linear portion of its characteristic resistance voltage curve for supplying said regulator means with rectified current having a variation in voltage with but greater than the variation of the generator voltage for controlling said regulating means to maintain the generator voltage constant and to prevent hunting action.

In witness whereof, I hereunto subscribe my name, this 12th day of May, 1931.

JOHN H. SOLE.